United States Patent
Brainard

[19]

[11] Patent Number: 5,479,083
[45] Date of Patent: Dec. 26, 1995

[54] NON-DISSIPATIVE BATTERY CHARGER EQUALIZER

[75] Inventor: Gerald L. Brainard, San Jose, Calif.

[73] Assignee: AST Research, Inc., Irvine, Calif.

[21] Appl. No.: 80,898

[22] Filed: Jun. 21, 1993

[51] Int. Cl.$^6$ ................................ H01M 10/46
[52] U.S. Cl. ................ 320/2; 320/14; 320/15; 320/21
[58] Field of Search ................ 320/2, 14, 15, 320/21, 18

[56] References Cited

U.S. PATENT DOCUMENTS

| | | | |
|---|---|---|---|
| 3,237,078 | 2/1966 | Mallory | 320/17 |
| 4,047,088 | 9/1977 | Himmler | 320/6 |
| 4,079,303 | 3/1978 | Cox | 320/17 |
| 4,179,647 | 12/1979 | Cummins et al. | 320/6 |
| 4,238,721 | 12/1980 | DeLuca et al. | 320/18 |
| 4,614,905 | 9/1986 | Petersson et al. | 320/18 |
| 4,684,814 | 8/1987 | Radomski . | |
| 4,792,743 | 12/1988 | Tsujino et al. | 320/15 |
| 4,816,736 | 3/1989 | Dougherty et al. | 320/17 |
| 4,967,136 | 10/1990 | Nofzinger | 320/6 |
| 5,003,244 | 3/1991 | Davis, Jr. | 320/17 |
| 5,028,859 | 7/1991 | Johnson et al. | 320/15 |
| 5,113,127 | 5/1992 | Hoffman et al. | 320/21 |
| 5,153,496 | 10/1992 | LaForge | 320/18 X |
| 5,177,425 | 1/1993 | Goto . | |
| 5,283,512 | 2/1994 | Stadnick et al. | 320/18 |

Primary Examiner—Peter S. Wong
Assistant Examiner—Robert Nappi
Attorney, Agent, or Firm—Knobbe, Martens, Olson & Bear

[57] ABSTRACT

A battery charger is disclosed for recharging reusable batteries in a manner that prevents overcharging of the same. The charger includes a voltage source and non-dissipative shunt arrangement that can be customized to charge any number of batteries. The charger may be a current limiting power supply that is controlled by the voltage or charge state of the batteries being recharged. The non-dissipative shunt includes a pair of transistors for each pair of batteries and an inductor placed one end between the battery pair and another end between the transistor pair. An oscillator, having two phases of equal, but opposite phase, is used to control each transistor to apply charge to a given battery during one phase and then to allow the charge to equalize between the battery pair during the second phase. The equalization is continued until both batteries reach a full charge without overcharging any one battery.

10 Claims, 3 Drawing Sheets

NON-DISSIPATIVE BATTERY CHARGER EQUALIZER

BACKGROUND OF THE INVENTION

This invention relates generally to battery rechargers and, more specifically, to a battery recharger that uses non-dissipative voltage equalization of series connected battery cells, typically lithium ion cells, during recharging.

Rechargeable batteries are well known for their versatility of being a readily replaceable power source that allows portability. Several drawbacks exist in most battery recharging systems. First, there are various types of rechargeable batteries ranging from standard lead-acid batteries to new exotic nickel metal hydride and lithium ion cells. In all cases, overcharging of the cells during the recharge is detrimental to the batteries in that excess heat and/or pressure may occur. This excess heat may destroy the battery by either damaging the battery structure or altering its chemical composition thus limiting its recharging capacity. Over pressure developed during overcharge can lead to nickel-cadmium cells exploding, which not only destroys the battery, but may release cadmium, which is adverse to the environment.

New systems of rechargeable batteries have recently been brought to market. These systems use lithium ion cells, which have advantages over other forms of rechargeable battery technology in that they have much higher charge and voltage capacities over conventional rechargeable batteries. Moreover, they are able to maintain their charge during a longer state than the other rechargeable systems. For example, ni-cad batteries are used with many electronic systems; however, ni-cad systems lack the ability to maintain charge for extended periods between use as well as to deliver a high charge for any length of time during operation.

Accordingly, several ni-cad cells must be combined in order to provide adequate powering capabilities in most electronic systems. Lithium ion cells, on the other hand, have overcome many of the disadvantages that are associated with ni-cad cells by being both more efficient and lighter than other forms of rechargeable batteries. This means that portable batteries for consumer electronic products can now be powered by batteries that are more efficient, lighter and more convenient.

Lithium cells are not without certain disadvantages, however. One drawback limiting the broader use of lithium cells is their susceptibility to overcharge. This is especially so when more than one battery is to be charged with the same charger. Overcharging can result in dangerous over temperature and over pressure levels that can potentially damage the cell and the electric system. One solution to prevent overcharge is to monitor the charge level on the cells such that as soon as one cell reaches a preset level, charging stops, leaving the remaining cells without a full charge.

Accordingly, what is needed is a battery recharger that is capable of distributing charge among several batteries being charged simultaneously without over charging or applying over voltage to any one or all of the cells. The system also should be able to recharge all batteries in the system to their full potential.

SUMMARY OF THE INVENTION

According to the present invention, a battery charger is disclosed that uses a novel non-dissipative charge equalizer to charge a pair of batteries to a full charge without overcharging or undercharging either battery. The charger includes a voltage source, which connects in series to a pair of batteries, and a non-dissipative charge equalizer, which couples to the voltage source. The equalizer diverts the current produced by the voltage source to the battery having a lesser voltage charge than the other battery. The charge equalizer includes a pair of switches, such as transistors, coupled in parallel to both batteries in such a way as to maintain equal charge across both batteries.

An inductor is included as part of the charge equalizer, which inductor is connected between the batteries and between the switches. The inductor prevents any overcharge from being applied to the batteries by storing the excess charge, which also prevents it from dissipating. The non-dissipated charge is applied to the battery with the lesser charge to equalize the charge between the batteries.

The batteries that may be charged with the charger include most types of reusable cells, such as, for example, lithium ion, nickel-cadmium, nickel metal hydride, and others that generally require relatively precise control to prevent overcharging. The battery source in the charger further includes current limiting devices coupled to each battery to provide charge monitoring and cutoff to prevent overcharging.

In another embodiment, a battery charging system is disclosed that can charge more than two batteries. The charger includes a voltage source and a non-dissipative charge equalizer. The voltage source is designed to generate a constant current within a limited voltage range and it is placed in series with the batteries, which are also placed in series one to another. The non-dissipative charge equalizer couples in parallel to the voltage source such that current from the voltage source is alternately diverted from each battery. Further, the charge equalizer includes nearly twice as many transistor switches as there are batteries. The transistors form pairs and each transistor pair is coupled in parallel to the batteries so as to maintain equal charge across all the batteries.

The charge equalizer further includes one less inductor than there are batteries. Each inductor is coupled between a first and second battery and a pair of transistor switches used to direct the excess charge stored by the inductor. An oscillator is used to control the operation of the transistors. The oscillator generates two phases, phase one and phase two. Phase one is connected to a first transistor in each pair of transistors associated with each inductor and phase two is connected to a second transistor associated with the same inductor. The two phases are substantially equal, but do not overlap, in time. This allows both transistor switches to be switched on and off alternately for substantially equal durations.

DETAIL DESCRIPTION OF SPECIFIC EMBODIMENTS

Figure 1:
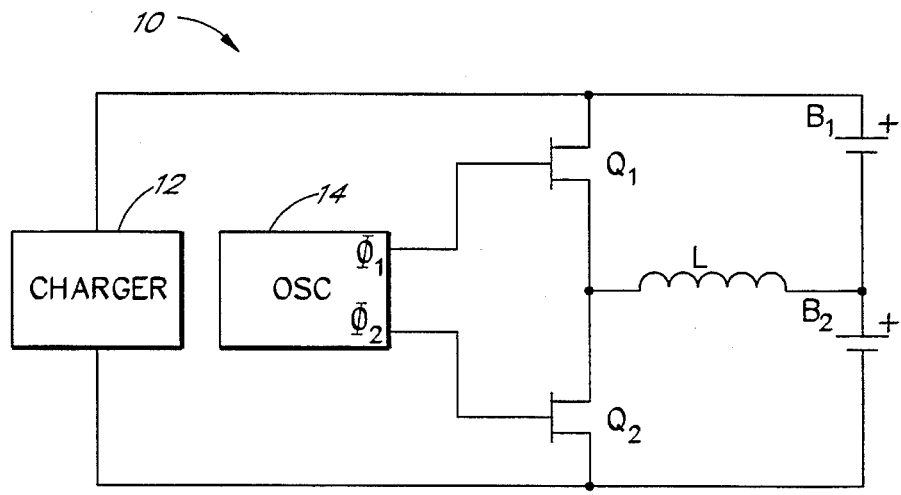
FIG. 1 is a schematic diagram of a battery charging system according to the present invention.

A battery charger 10, illustrated in FIG. 1, generally includes a charger control element 12, an oscillator 14, a pair of switching transistors Q1 and Q2, and an inductor L. A pair of batteries B1 and B2 are placed in series with respect to charger 12. Transistors Q1 and Q2 are placed in parallel to batteries B1 and B2. The inductor L connects between the negative lead of battery B1 and the positive of battery B2 and between transistors Q1 and Q2. The gates of both transistors are controlled by outputs from oscillator 14. A first phase is used to control the gate of transistor Q1 and a second phase is used to control the gate of transistor Q2.

Charger 12 is a constant current source with voltage limiting ability to prevent overcharging of the battery cells B1 and B2. Charger 12 further includes additional current limiting means, such as, for example, a current limiting device for a battery charger or power supply, or both, as taught in commonly assigned U.S. patent application Ser. No. 08/080,272, entitled Maximally Efficient Multiple Battery Rapid Charger/Computer Device Power Controller, herein incorporated by reference for all purposes.

Batteries B1 and B2 are lithium ion cells, which require protection to prevent either cell from charging beyond a safe voltage limit. Charger 12 is a current limiting voltage supply having an upper voltage limit twice that of the upper limit of either cell. This is accomplished by making the voltage across both cells at full charge of charger 12 to be equal the full voltage charge level of charger 12.

The charging arrangement illustrated in FIG. 1 provides a shunt around each cell such that as the voltage reaches the upper limit across one cell, the shunt becomes conductive, thereby diverting current past the cell and through the cell having the lesser voltage. Depending on the charging current, this would normally result in large power loss and heat within the battery pack. The inductor is used to prevent such power loss by acting as a non-dissipative shunt that is alternately switched in parallel and in proper phase with each cell. Charge voltage is then forced across the cells in the inverse ratio of the phases or duty cycle of the driving function of the inductor switches. If, for example, the inductor is switched at a 50% duty cycle, the voltage will be held equal in a non-dissipative fashion across the two cells.

One advantage of the battery charging system 10 is that the voltage applied across the batteries is maintained equally, such that regardless of the charge state of both batteries at the beginning of the recharge cycle, both batteries will be fully charged during the recharge cycle. By contrast, prior art charging systems typically measure the charge on both batteries, or the battery with the highest charge, at initial charge state and begin charging until the battery with the highest charge reaches a preset level, at which time the charging system then stops charging without fully charging the second cell. This prior art design prevents multiple batteries from reaching full charge during the recharge cycle.

A second advantage of the charger system of the present invention is the addition of the current limiting feature. Current limiting allows each battery to be independently subjected to a rapid charge cycle until such a time as that battery reaches a near full charge state, at which time the rapid charge cycle is ended. The current limiting feature then directs the current to the battery with the lesser charge to bring it up to a full charge in order to complete rapid charging of all cells. After which, the system finishes the charge at a trickle charge state to bring all cells to a full charge.

In one specific embodiment, battery cells B1 and B2 each have a charge capacity of 3.6 volts (V). Inductor L1 has an inductance of 100 microhenries (H) and the phase function for phase 1 and phase 2 of oscillator 14 is set at a 200 kilohertz (kHz). Further, charger 12 is capable of establishing a voltage range of 4.0 to 8.2 Volts.

Figure 2:
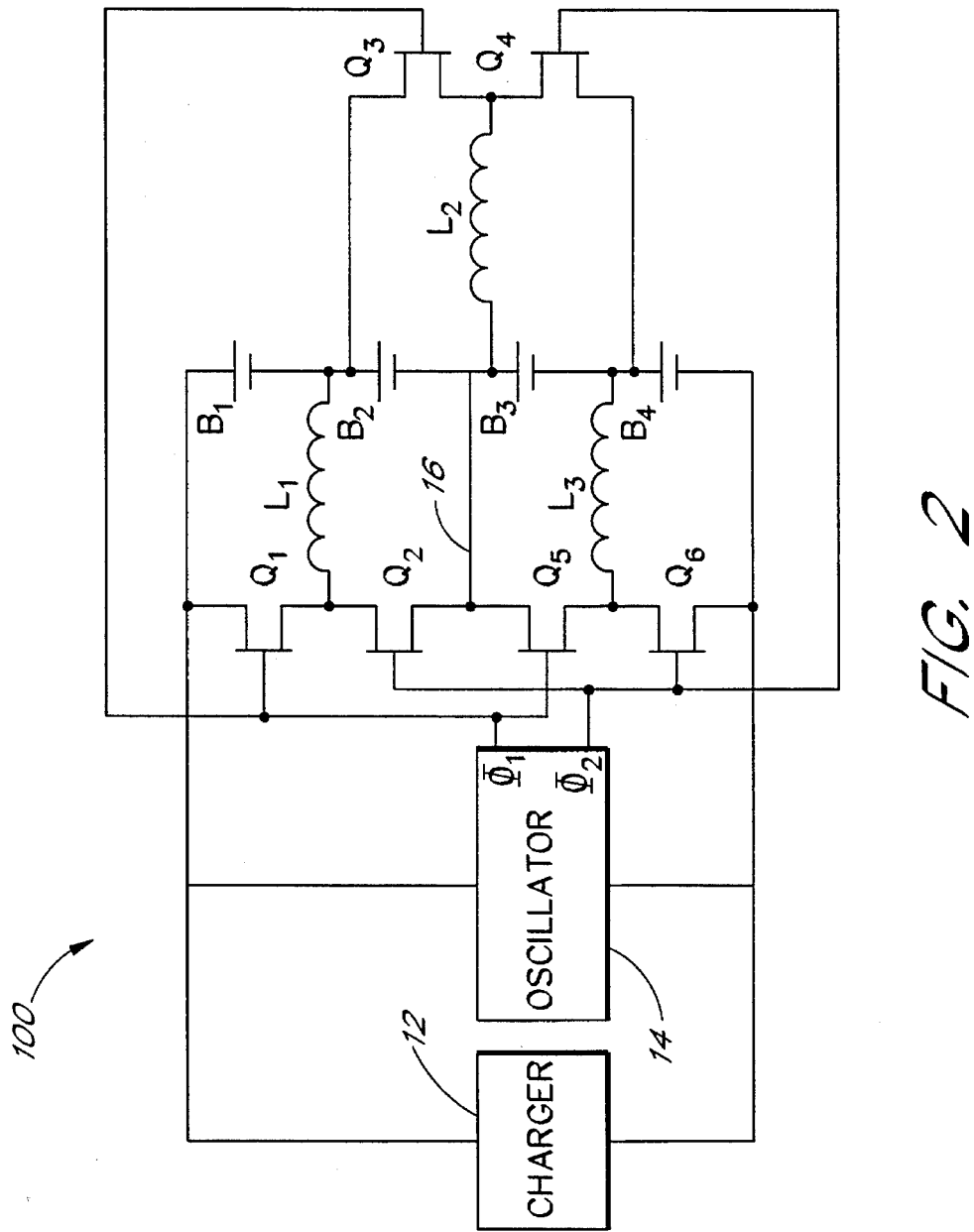
FIG. 2 is a schematic diagram of the battery charging system according to the present invention capable of charging more than two cells.

FIG. 2 illustrates a charging system 100 capable of charging more than two batteries. Four batteries B1, B2, B3 and B4 may be charged using charger 12 and oscillator 14. Transistors Q1 and Q2, batteries B1 and B2, and inductor L1 are the same as those found in FIG. 1. Batteries B1, B2, B3 and B4 are placed in series. Transistors Q3 and Q4 are placed in series one to another but are placed in parallel to batteries B2 and B3. A second inductor L2 is placed between batteries B2 and B3 and between transistors Q3 and Q4. Transistors Q5 and Q6 are added in parallel to transistors Q1 and Q2, but in series with batteries B3 and B4. A third inductor L3 is placed between transistors Q5 and Q6 and between batteries B3 and B4. Phase one of oscillator 14 connects to transistors Q1, Q3, and Q5, while phase two of oscillator 14 connects to transistor Q2, Q4, and Q6. A current path 16 is further provided between transistors Q2 and Q5 and between batteries B2 and B3.

During operation, phase one switches on to provide a charging path through transistors Q1, Q3, and Q5. Batteries B2 and B4 charge during phase one. Phase two switches on transistors Q2, Q4, and Q6, thus providing a charging path for batteries B1 and B3. In both instances, inductors L1–L3 equalize the charge across their respective charging pair of batteries B1 and B2, B2 and B3, and B3 and B4. When more charge is on a particular battery, such as, for example, battery B1 versus B2, the greater charge of B1 equalizes between batteries B1 and B2, thus bringing battery B2 to the same charge level as B1.

It has been demonstrated that the charging system may charge a pair of batteries or multiple pairs of batteries. Furthermore, the charging system is capable of charging an odd number of batteries, for example, at least three batteries may be charged in the same unit. This is accomplished by taking the charger of FIG. 2 and removing battery B4, transistors Q5 and Q6, and inductor L3. The voltage of charger 12 is set to be three times that of each battery's full charge capability, or the same charge as the three batteries in series. Again, as the transistors connected to phase one are switched on, a conductive path is provided to the battery, namely battery B2. When phase two of oscillator 14 is active, transistors Q2 and Q4 are switched on, thereby providing a charging path for batteries B1 and B3. Inductor L1 and L2 provide charge equalization capabilities such that excess charge on any of the batteries is shared with the other batteries so that an equal charge is maintained on all.

Figure 3:
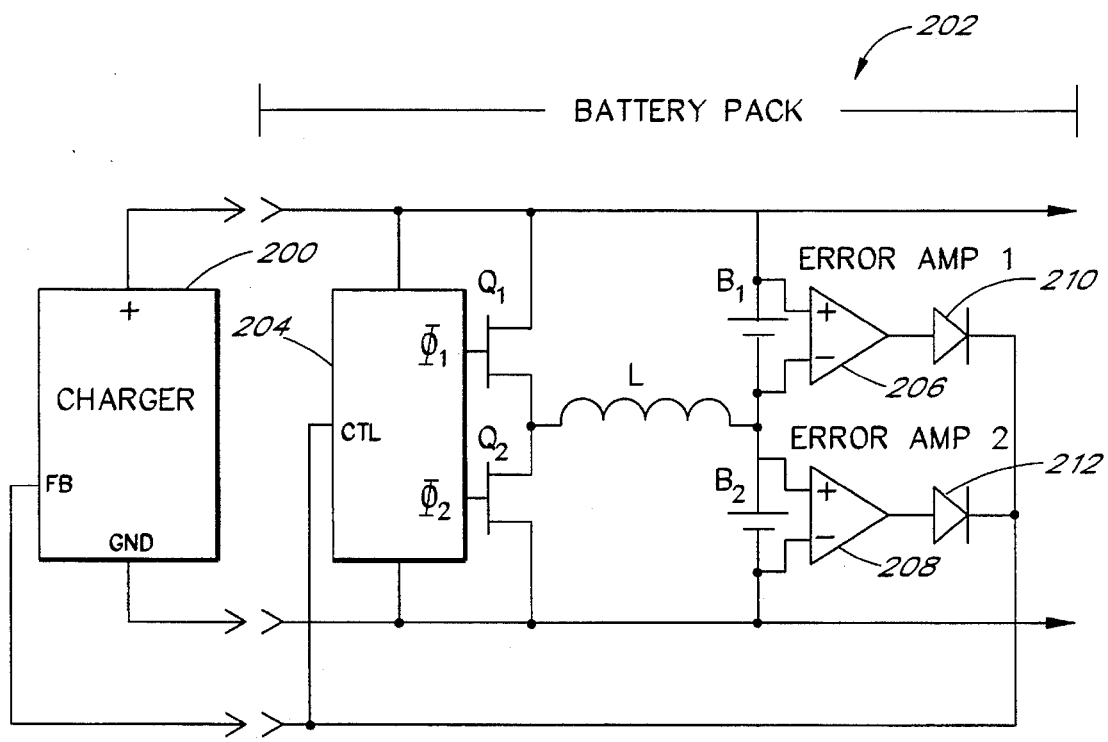
FIG. 3 is a schematic diagram of the battery charging system wherein voltage limiting is used to control charging of the cells more accurately.

A charging circuit is further illustrated in FIG. 3 in which a charger 200 is found that is a current limited power supply. Charger 200 operates with battery pack 202, which includes an oscillator 204, transistor pair Q1 and Q2, inductor L, and batteries B1 and B2. The elements of battery pack 202 are arranged identically to the battery charger of FIG. 1, but the battery pack further includes error amplifier 206, having a positive and negative input across the respective positive and negative ends of battery B1, and error amplifier 208, having a positive and negative input across respective positive and negative ends of battery B2. Each output of amplifier 206 and 208 includes diode 210 and 212, respectively, and both connect to a control pin FB of charger 200. Oscillator 204 is powered by charger 200 and includes a control pin CTL, which connects to control pin FB.

Charger 200 uses a correction voltage applied at feedback pin FB to control its output voltage. The correction voltage is generated from error amplifiers 206 and 208 internal to battery pack 202 and are designed to respond when the voltage across either of the batteries reaches the maximum allowable voltage. This action holds the voltage at a constant, safe level across the battery with the greatest charging voltage at which point the equalization circuit diverts charging current to the battery not yet fully charged.

Figure 4:
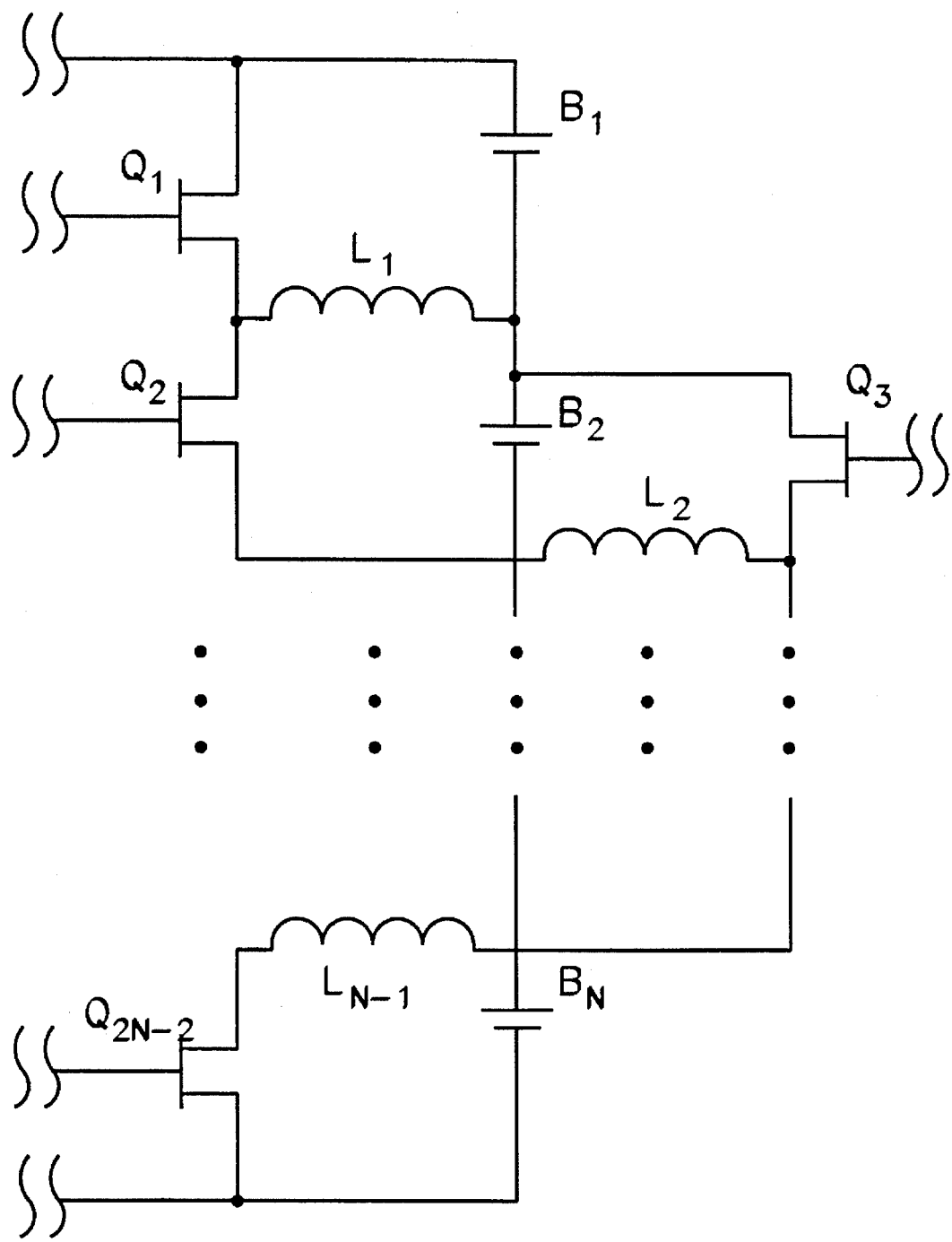
FIG. 4 is a schematic diagram of a battery charging system capable of charging N batteries.

Charging arrangements for two cell, three cell, and four cell designs have been shown. FIG. 4 illustrates an "N" cell arrangement including batteries $B_1$–$B_N$, transistors $Q_1$–$Q_{2N-2}$, and inductors $L_1$–$L_{N-1}$, which are all arranged either according to the style of the three-battery charger design or the four-battery charger design depending upon whether N is "odd" or "even," respectively. Also, each battery would have an error amplifier (see FIG. 3) connected to it with feedback going to the voltage source to limit the voltage, thus preventing overcharging of the battery.

Another way of determining the arrangement, which arrives at the same results, is to identify the number of inductors in the charger system. The charger is able to charge one battery more than there are inductors. Also, since two transistors are associated with each inductor, there will be twice as many transistors as there are inductors.

Several specific embodiments of the present invention have been shown and described. It will be obvious to those skilled in the art that various modifications and substitutions may be made without departing from the spirit of the invention. Accordingly, the invention is intended to be limited only within the scope the appended claims.

What is claimed is:

1. A battery charging system for charging two batteries comprising:

a voltage source having a limited voltage range for generating a current and having connectors tier connecting said voltage source to a first battery and a second battery, wherein said first battery has a lesser charge than said second battery; and an inductive charge equalizer responsive to voltage levels of said first and second batteries, wherein said charge equalizer is coupled to said voltage source such that more current from the voltage source is directed to said first battery than to said second battery, wherein the charge equalizer further comprises first and second transistor switches and an oscillator, said oscillator having a first phase and a second phase, each coupled to said first and second transistor switches, respectively, both phases being substantially equal, but not overlapping in time, so that both transistor switches are switched on and off alternately for substantially equal durations.

2. The battery charger according to claim 1 wherein the charge equalizer includes a pair of switches, coupled in parallel to said first and second batteries in such a manner as to maintain equal charge across both batteries.

3. The battery charger according to claim 1 wherein said batteries are lithium ion cells.

4. The battery charger according to claim 1 wherein the voltage source includes current limiting means coupled to each one of said first and second batteries.

5. A battery charging system for charging multiple batteries comprising:

a voltage source for generating a current, said voltage source having a limited voltage range and having connections for receiving at least two batteries, coupled in series to each other and to said voltage source; and an inductive charge equalizer responsive to voltage levels of said at least two batteries, wherein said charge equalizer is coupled in parallel to said voltage source such that some current from the voltage source is alternately diverted amongst said at least two batteries, wherein the charge equalizer further comprises first and second transistor switches and an oscillator, said oscillator having a first phase and a second phase, each coupled to said first and second transistor switches, respectively, both phases being substantially equal, but not overlapping, in time, so that both transistor switches are switched on and off alternately for substantially equal durations.

6. The battery charger according to claim 5 wherein the charge equalizer includes at least two switches, coupled in parallel to said at least two batteries so as to maintain equal charge across said at least two batteries.

7. The battery charger according to claim 5 wherein said batteries are lithium ion cells.

8. The battery charger according to claim 5 wherein the voltage source includes current limiting means coupled to each one of said first and second batteries.

9. A battery charger for recharging batteries comprising:

a voltage source for generating a charging current having a limited voltage range;

means for connecting N batteries in series with the voltage source;

N–1 inductors for equalizing the charge from said voltage source amongst said N batteries, each inductor being connected between a respective battery pair and responsive to voltage levels of said batteries in said respective battery pair;

N–1 transistor pairs, each transistor pair connecting in parallel to said respective battery pair and to a respective one of said inductors such that some current from the voltage source is alternately diverted amongst the batteries in said battery pair, thus enabling said inductor to equalize the charge between the batteries so paired; and an oscillator, generating a first phase and a second phase, nearly equal and opposite to said first phase, the first phase being connected to a first transistor in each of said transistor pairs and the second phase being connected to a second transistor in each transistor pair, both phases being substantially equal, but not overlapping in time, so that the transistors within each transistor pair are switched on and off alternately for substantially equal durations.

10. The battery charger according to claim 9 further comprising N voltage controllers, each connected to one battery and further connected to said voltage source, for providing voltage source charge feedback so that said voltage source limits the charge voltage in response to said charge feedback, thereby preventing each battery from being overcharged.

* * * * *

UNITED STATES PATENT AND TRADEMARK OFFICE
CERTIFICATE OF CORRECTION

PATENT NO. : 5,479,083

DATED : December 26, 1995

INVENTOR(S) : Gerald L. Brainard

It is certified that error appears in the above-identified patent and that said Letters Patent is hereby corrected as shown below:

In column 5 at line 30, change "tier" to --for--

Signed and Sealed this

Twenty-fourth Day of August, 1999

Attest:

Q. TODD DICKINSON

*Attesting Officer*    *Acting Commissioner of Patents and Trademarks*